United States Patent
Cattaneo (10) Patent No.: US 10,750,864 B2
(45) Date of Patent: Aug. 25, 2020

(54) AUTOMATICALLY ACTIVATED ANTI-DISENGAGEMENT SYSTEM FOR A HIDDEN HANGING BRACKET FOR WALL CUPBOARDS

(71) Applicant: Leonardo S.r.l., Figino Serenza (IT)

(72) Inventor: Carlo Cattaneo, Figino Serenza (IT)

(*) Notice: Subject to any disclaimer, the term of this patent is extended or adjusted under 35 U.S.C. 154(b) by 0 days.

(21) Appl. No.: 16/096,345

(22) PCT Filed: May 11, 2017

(86) PCT No.: PCT/EP2017/061337
§ 371 (c)(1),
(2) Date: Oct. 25, 2018

(87) PCT Pub. No.: WO2017/198541
PCT Pub. Date: Nov. 23, 2017

(65) Prior Publication Data
US 2019/0125081 A1    May 2, 2019

(30) Foreign Application Priority Data

May 16, 2016 (IT) .......................... 102016000049829

(51) Int. Cl.
*A47B 95/00* (2006.01)
*F16B 45/00* (2006.01)

(52) U.S. Cl.
CPC ............ *A47B 95/008* (2013.01); *F16B 45/00* (2013.01)

(58) Field of Classification Search
CPC ........ A47B 95/00; A47B 95/008; F16B 45/00
See application file for complete search history.

(56) References Cited

U.S. PATENT DOCUMENTS

| | | | | |
|---|---|---|---|---|
| 2,733,887 A | * | 2/1956 | Schmidt ............... | A47B 95/008 248/224.8 |
| 4,660,793 A | * | 4/1987 | Mark ...................... | A47J 45/02 248/224.8 |
| 5,063,715 A | * | 11/1991 | Goodman ............... | A47B 57/16 211/192 |

FOREIGN PATENT DOCUMENTS

| | | | | |
|---|---|---|---|---|
| CA | 2951329 A1 | * | 12/2015 | ........... A47B 95/008 |
| DE | 9211732 U1 | * | 11/1992 | ........... A47B 95/008 |
| DE | 9201572 | | 3/1993 | |
| DE | 29920095 U1 | * | 2/2000 | ........... A47B 95/008 |
| DE | 202015103519 U1 | * | 10/2016 | ........... A47B 95/008 |
| DE | 102016101624 A1 | * | 1/2017 | ........... A47B 95/008 |
| WO | WO-2012084130 A1 | * | 6/2012 | ........... A47B 95/008 |
| WO | WO-2017032812 A1 | * | 3/2017 | ........... A47B 95/008 |

* cited by examiner

*Primary Examiner* — Andrew M Roersma
(74) *Attorney, Agent, or Firm* — Themis Law

(57) ABSTRACT

An anti-disengagement system that can be automatically activated for a hidden hanging bracket of a wall cupboard is employed to prevent the disengagement of a wall cupboard hooked to a support, fixed to a wall, with a movable hook having a curved hooking tooth forming part of a hanging bracket coupled to the wall cupboard at the rear. Elastically yielding engagement elements are automatically snap-activated upon insertion of the curved hooking tooth into a housing of the support.

12 Claims, 11 Drawing Sheets

AUTOMATICALLY ACTIVATED ANTI-DISENGAGEMENT SYSTEM FOR A HIDDEN HANGING BRACKET FOR WALL CUPBOARDS

The present invention relates to an automatically activated anti-disengagement system for a hidden hanging bracket for wall cupboards, hooked to a support fixed to the wall, generally a metal bar or plate.

In the field of wall cupboards, the use of a system for constraining a cupboard to the wall, is well known. This system envisages the use of a hidden hanging-bracket device, positioned behind the lining of the furniture, which is hooked, by means of its hook, to a bar or plate fixed to the wall. It is also well known that two adjustment mechanisms of the hanging bracket cooperate with said hook, one in depth (horizontal) and the other in height (vertical), provided with control screws.

Hidden hanging brackets of this type are known, for example, from patents EP 1549177, EP 2219495 and European patent application EPA 11712481.8 to which reference should be made for further clarifications and which should be considered as being an integral part of the present description.

Furthermore, it is well known that if upward forces are applied to the above furniture thus hooked, this could become disengaged from the support and fall, causing serious damage, non only to things, but above all to people.

In addition to this risk, it should also be considered that safety regulations are coming into force in many countries, which make the provision of accidental anti-disengagement systems in wall cupboards compulsory.

European patent application EPA 10708147.3, filed on Mar. 5, 2010 in the name of the same Applicant, proposes a very satisfactory solution to the above problem of avoiding the accidental disengagement of a wall cupboard from its support, due to upward forces applied to the furniture itself. An anti-disengagement system is in fact provided, wherein a piece of furniture is hooked to a support fixed to the wall by means of a hook of a hanging-bracket device. Releasable reciprocal constraint means are provided in this system, between the hook and the support.

A further example of an anti-disengagement system developed by the Applicant is the object of international patent application PCT/EP2015/00128.

Also in this case, the use is envisaged of releasable means between the parts, which cooperate for preventing disengagement, consisting of a screw whose tip or end part is engaged with a flap or horizontal edge folded directly from the support.

Also in this case, therefore, an action by the user is necessary for obtaining the active anti-disengagement position between the parts.

Solutions of this type are not particularly simple to use if the wall cupboard must be positioned on a wall which at least partly provides a cover with tiles or the like and which consequently does not have a completely vertical trend (regular and/or continuous).

In this case, the wall cupboard in particular with a hanging bracket of the known type must be tilted in order to effect the hooking.

The assumption is however to tilt (move towards the exterior of the furniture) the arm carrying the engagement hook of the hanging bracket to the bar or support fixed to the wall, as much as possible.

Furthermore, it is not easy to intervene in order to effect the stable positioning of the anti-disengagement device when the wall cupboard is hooked on the bar to the wall.

It is therefore easy to understand the problem in this case and what drawbacks an anti-disengagement system according to the known art can create for the user.

DE 9201572U1 describes an anti-disengagement system according to the preamble of claim 1.

An objective of the present invention is therefore to provide an anti-disengagement system for a hidden hanging bracket for wall cupboards that is constructively simple and which does not cause the assembly problems of the furniture to the wall indicated above.

A further objective of the present invention is also to minimize or even exclude any type of intervention by the user on the anti-disengagement device when assembling the furniture to the wall.

Another objective of the present invention is to provide an anti-disengagement system for a hidden hanging bracket for a wall cupboard that can also be easily be used in the case of a supporting wall that is not perfectly vertical or with a raised portion due to the presence of tiles.

The objectives listed above are achieved, according to the invention, by an anti-disengagement system for a hidden hanging bracket for a wall cupboard as defined in the enclosed claims.

The structural and functional characteristics of the invention and its advantages with respect to the known art can be clearly understood from the following description, referring to the enclosed drawings, which show illustrative embodiment examples of a system produced according to the innovative principle of the invention itself.

Figure 1:
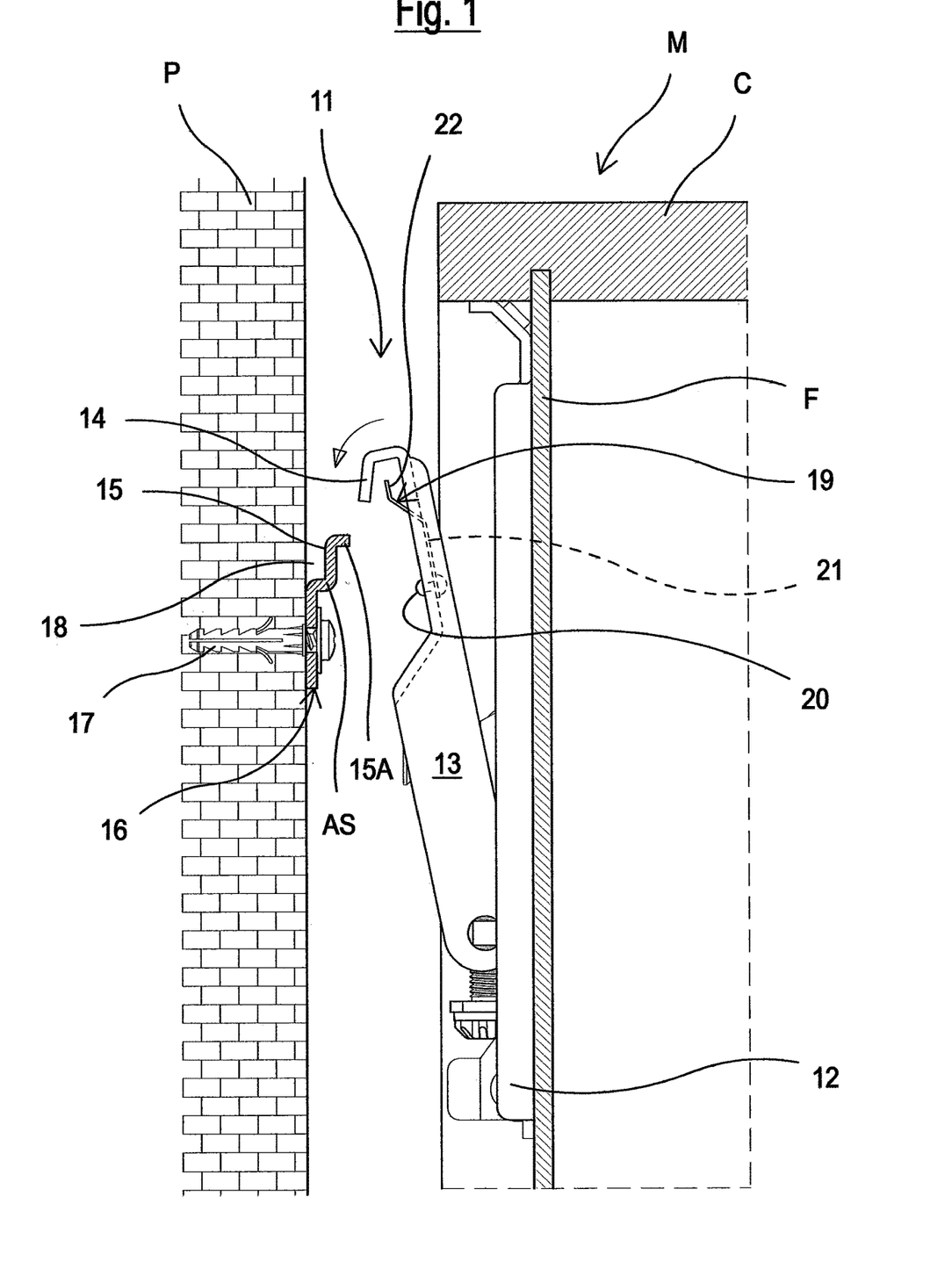
FIG. 1 is a partially sectional raised side view illustrating a first embodiment of the system according to the invention with the wall cupboard carrying a hanging bracket ready for implementing an engagement phase to a supporting bar fixed to the wall.

As illustrated first of all in FIG. 1 of the drawings, this shows an anti-disengagement system for a hidden hanging bracket for wall cupboards according to the present invention. In this example, a hanging bracket 11 is positioned behind a wall cupboard M through its base 12, constrained to a top C and a lining F. The hanging bracket 11 provides a movable hook 13 which extends from the base 12.

Two adjustment mechanisms (known) of the position in depth (horizontal) and in height (vertical) of the hook 13, shown only in minimum detail, are assembled on the base 12.

The hook 13 terminates at the front with a curved hooking tooth 14 destined for being hooked to a corresponding section 15 of a metal bar or plate 16 fixed to a wall P by means of dowels 17.

The hanging bracket 11 is in itself a hidden hanging-bracket device of the known type, as described for example in patents EP 1549177 and EP 2219495, to which reference should be made for further clarifications, and which should be considered as being an integral part of the present description, as non-limiting examples, of hanging brackets of the known type.

The section 15 of the bar 16 defines, with the wall P, a channel 18 in which the curved tooth 14 is housed. The bar 16 preferably has, for example, a "C"-shaped section, from the upper wing AS of which the above-mentioned section 15 extends vertically. A horizontal flap (edge) 15A square-folded directly from the section 15 of the bar 16, is also provided.

The bar 16, however, can have sections different from the "C"-shaped section illustrated, for example a section in which the lower wing of the "C" is missing, or also other sections.

An anti-disengagement group which, in the embodiment shown in the figures, is composed of an elastic lamina 19 fixed to the body (arm) of the hook 13 for example by means of a rivet 20, in at least a part of the same, cooperates with the curved tooth 14 of the hook 13, and with the bar 16.

The elastic lamina 19 provides, in fact, a fixing portion 21 on which the rivet 20 is positioned, and a free end 22 which passes through a window 23 formed in the hook 13 to face the inside of the curved tooth 14. Said free end 22 has the form of a flattened "S" to enable it to exert its opposing action. As already mentioned, said preferably shaped free end 22 extends inside the curved tooth 14 of the hook 13 to better exert its anti-disengagement hooking action in collaboration with the horizontal flap (edge) 15A square-folded directly from the section 15 of the bar 16, once the hook has been housed in the channel 18 of the support to the wall P in the form of a bar 16.

The invention therefore provides that the support or bar 16 and the curved hooking tooth 14 of the movable hook 13 provide elastically yielding engagement elements that can be automatically snap-activated with the insertion of the curved hooking tooth 14 of the hook 13 in the housing or channel 18 of the support or bar 16. Said elastically yielding engagement elements can be seen to comprise the elastic lamina 19 made integral with the hook 13 in at least a part thereof.

It can thus be seen how a hanging bracket is produced, provided with an anti-disengagement group opposed to the hooking point of the same hanging bracket.

FIGS. 2 to 5 show the same view as FIG. 1 further schematized to illustrate the subsequent engagement phases of the wall cupboard M with respect to the wall P until a stable final position is reached.

Figure 2:
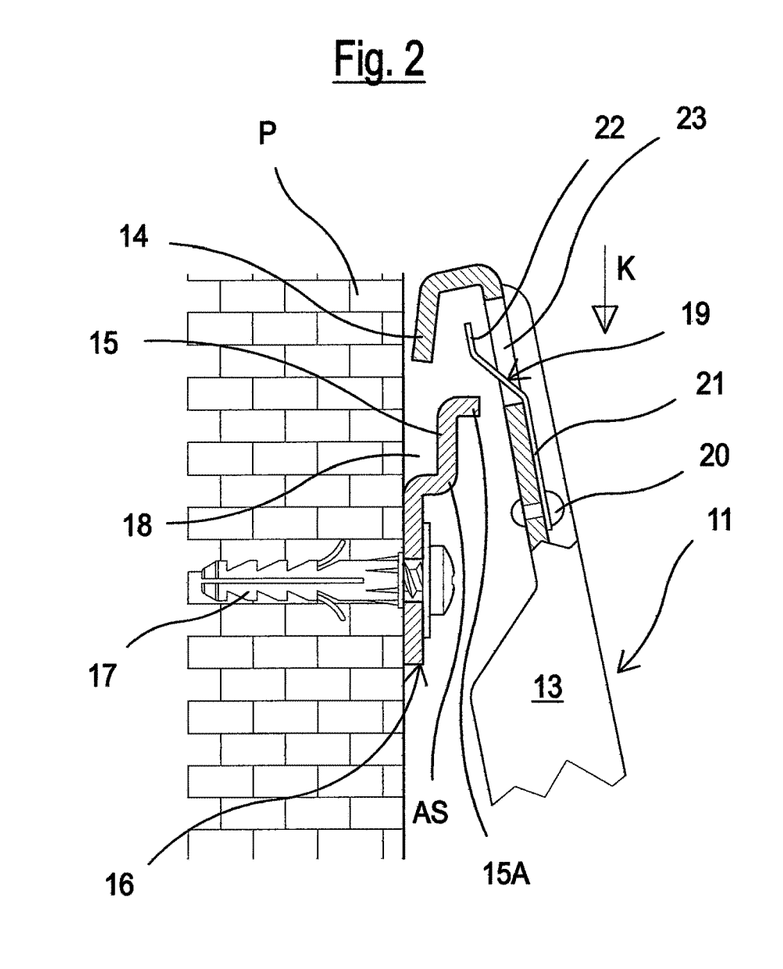
FIGS. 2 to 5 show the same view schematized for illustrating subsequent engagement phases until a stable and secure final position is reached.

In particular, it can be seen how, in FIG. 2, the wall cupboard M carrying the hanging bracket 11 is moved towards the wall P so as to bring the hook 13 above the bar 16.

The wall cupboard M is lowered from this position according to the arrow K to effect the stable positioning of the hook 13 with respect to the bar 16.

In its lower movement to effect the engagement (FIG. 3), it can be seen how the free end 22 of the elastic lamina 19 bumps against and then slides with respect to the horizontal square-folded flap (edge) 15A of the section 15 of the bar 16.

Figure 3:
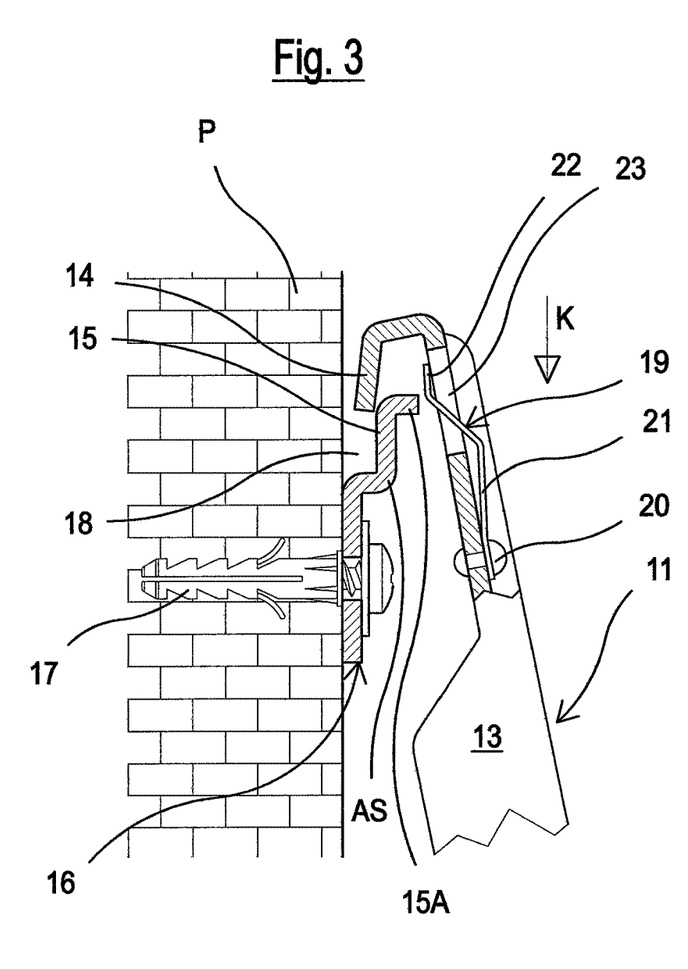

This causes a flexion of the elastic lamina 19 which allows the lowering of the hook to be continued. This flexion is such that the curved tooth 14 of the hook 13 becomes positioned inside the channel 18 defined by the wall P with the section 15 of the bar 16.

Figure 4:
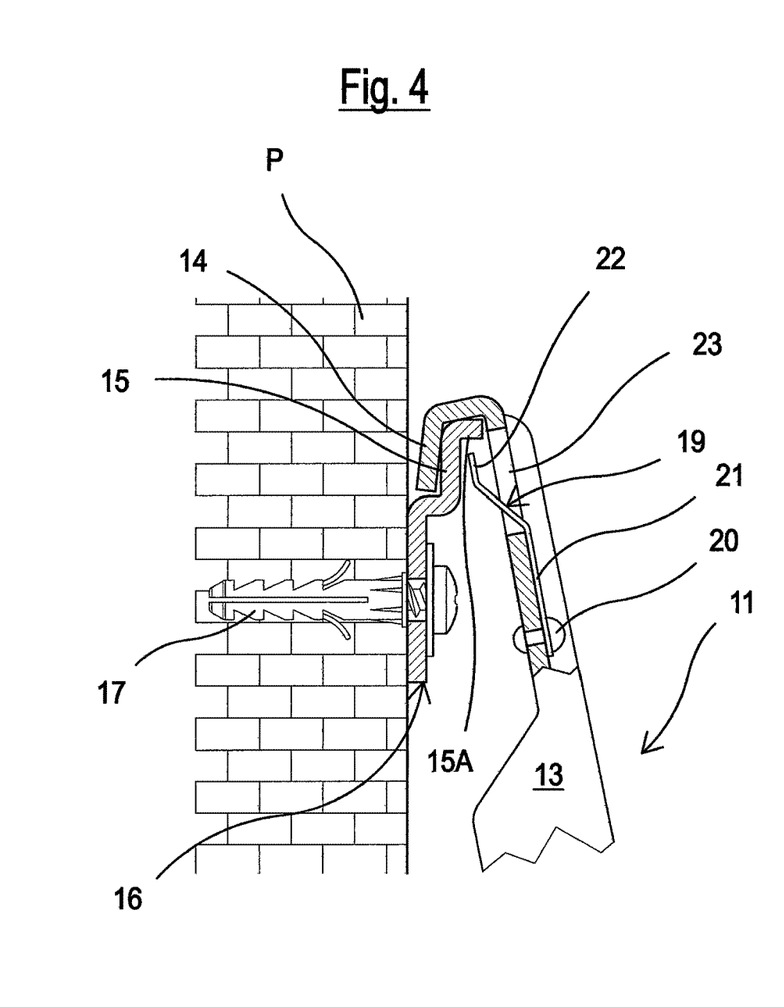

In this position, it can also be seen that the elastic lamina 19, no longer bent by the horizontal flap 15A of the section 15 of the bar 16, returns to its original position (FIG. 4). This position thus automatically determines the anti-disengagement function of the lamina 19.

Figure 5:
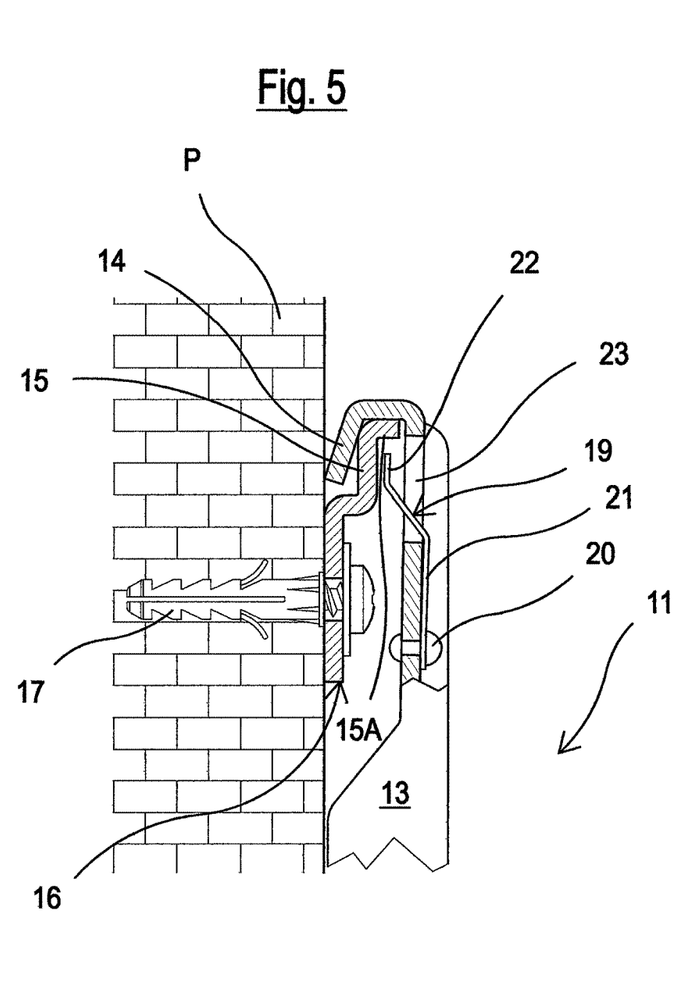

It can also be noted that this anti-disengagement function is active regardless of the adjustment position in depth of the hanging bracket, as can be seen in FIG. 5 in which the hanging bracket is perfectly aligned with the surface of the wall P.

Figure 5A:
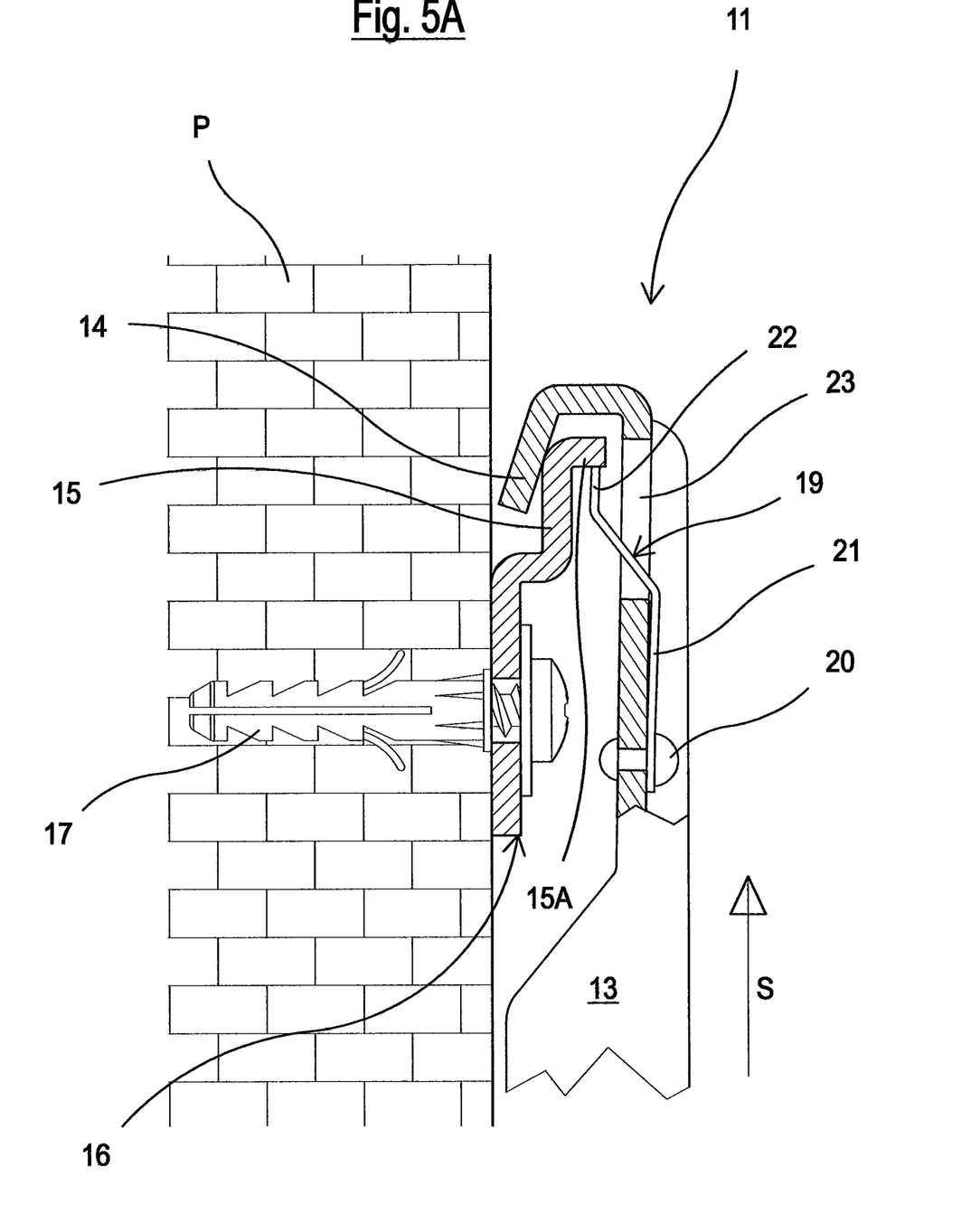
FIG. 5A is a view similar to the previous views from 2 to 5, but enlarged, which shows how the anti-disengagement system of the invention exerts its function.

FIG. 5A shows, with a view similar to the previous views of FIGS. 2 to 5, but enlarged, how the anti-disengagement system of the present invention exerts its function. If a force S, in fact, causes a lifting of the wall cupboard M, the collaboration and engagement of the lamina 19 with the horizontal flap 15A of the section 15 of the bar 16 blocks the furniture in position with an anti-disengagement function. It should be noted how the elastic lamina 19 operates in an opposite position with respect to the hooking point or rotation point of the hook 13 during the assembly phase of the furniture.

The elastic lamina 19, in fact, operates or acts or becomes engaged in correspondence with the rotation point of the hook 13 as indicated above.

The functioning of the anti-disengagement system according to the invention is therefore clearly illustrated in the operating sequence of the previous FIGS. 1-5.

Figure 6:
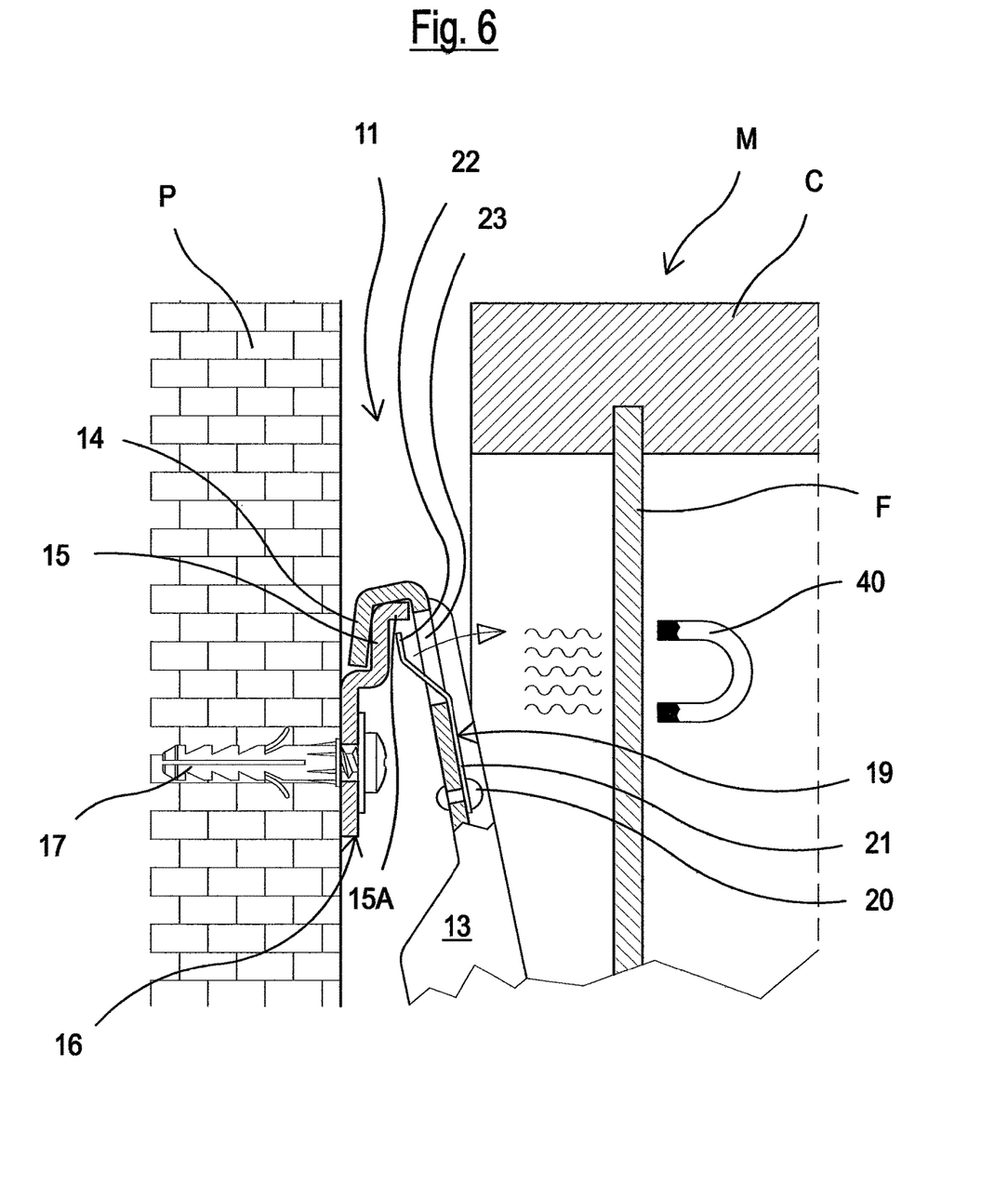
FIGS. 6 and 7 illustrate with a similar view, how the disengagement phase of the system of the present invention is effected, starting from the stable engagement position of FIG. 5.
Figure 7:
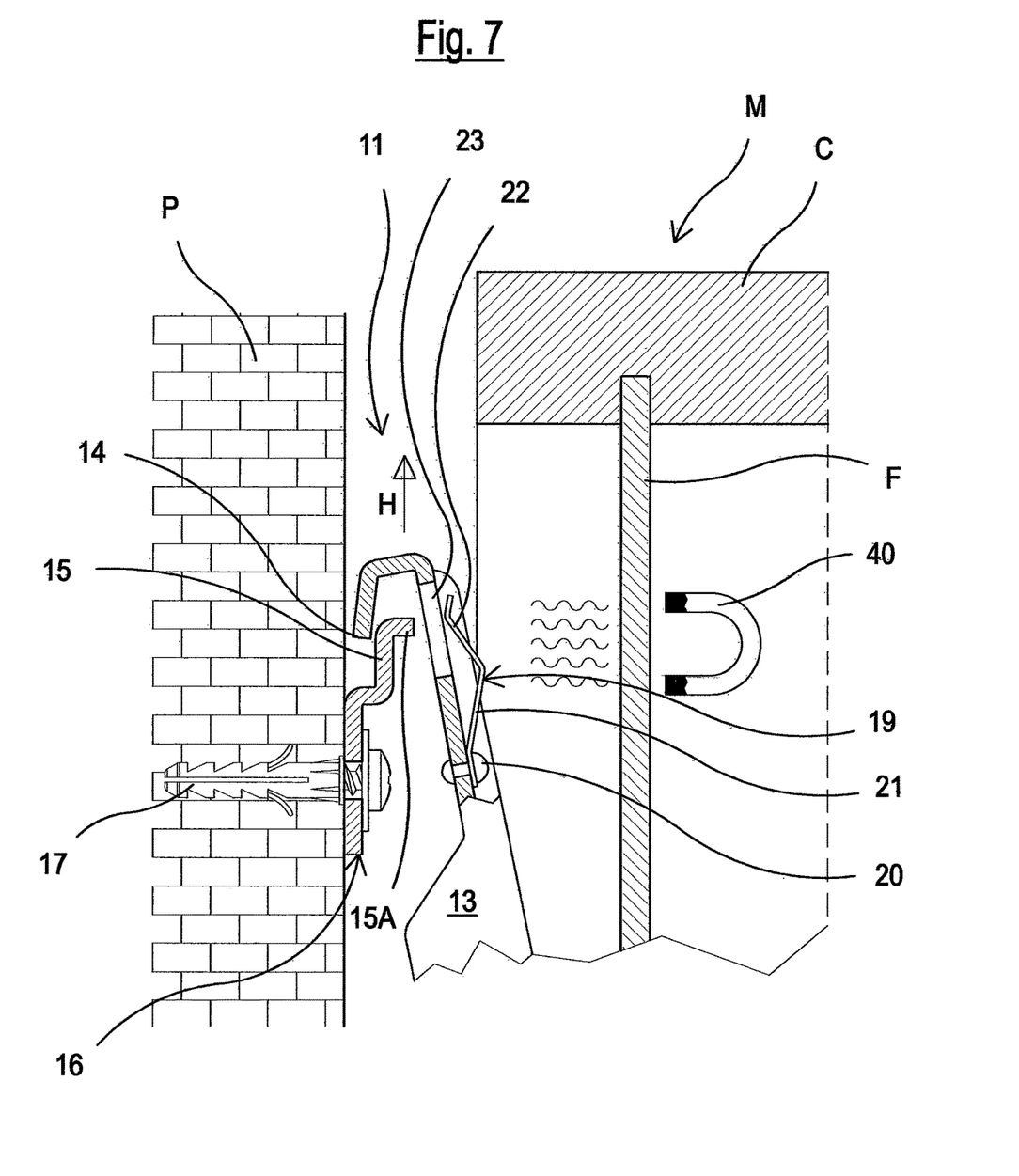

The subsequent FIGS. 6 and 7 very clearly illustrate how the disengagement phase of the system of the present invention can be effected when the wall cupboard must be removed from the wall P.

Starting from the stable hooking position of FIG. 5 or even better from that shown in FIG. 4 when the adjustment in depth has been brought back to its initial position obtained in the hooking phase, the following procedure is adopted.

FIG. 6 shows how a magnet 40—which is positioned inside the wall cupboard M, at the lining F—can be used.

This magnet 40 is positioned in correspondence with the elastic lamina 19 of the hanging bracket 11 (FIG. 6).

The action of the magnet 40 causes the backward flexion of the elastic lamina 19 (FIG. 7) and the elastic lamina 19 is retracted at its free end 22, which becomes positioned inside the window 23 formed in the body of the hook 13.

In this way, said free end 22 of the elastic lamina 19 becomes disengaged from any possible incidence with the horizontal square-folded flap (edge) 15A of the section 15 of the bar 16.

This allows the free lifting of the wall cupboard M, i.e. of the hook 13 so that the curved tooth 14 of the hook 13 is extracted from the channel 18 between the bar 16 and the wall P. The wall cupboard M is then extracted according to the arrow H, by lifting.

Figure 8:
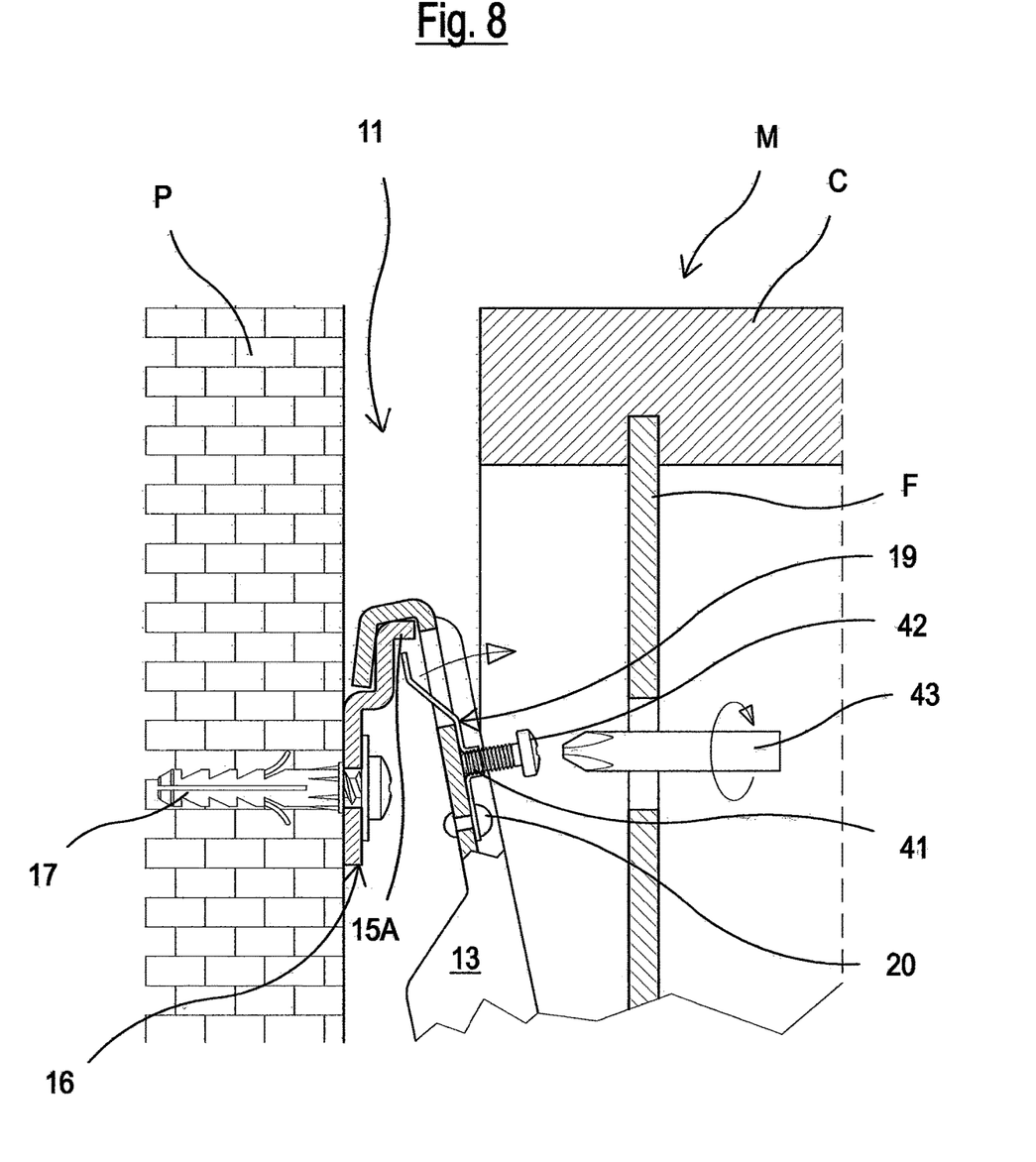
FIGS. 8 and 9 illustrate, with a view similar to the previous views, how the disengagement phase of the system of the present invention is effected, operating with a different mode and means, in the example with a screw device or starting from a system of the invention in a different embodiment.
Figure 9:
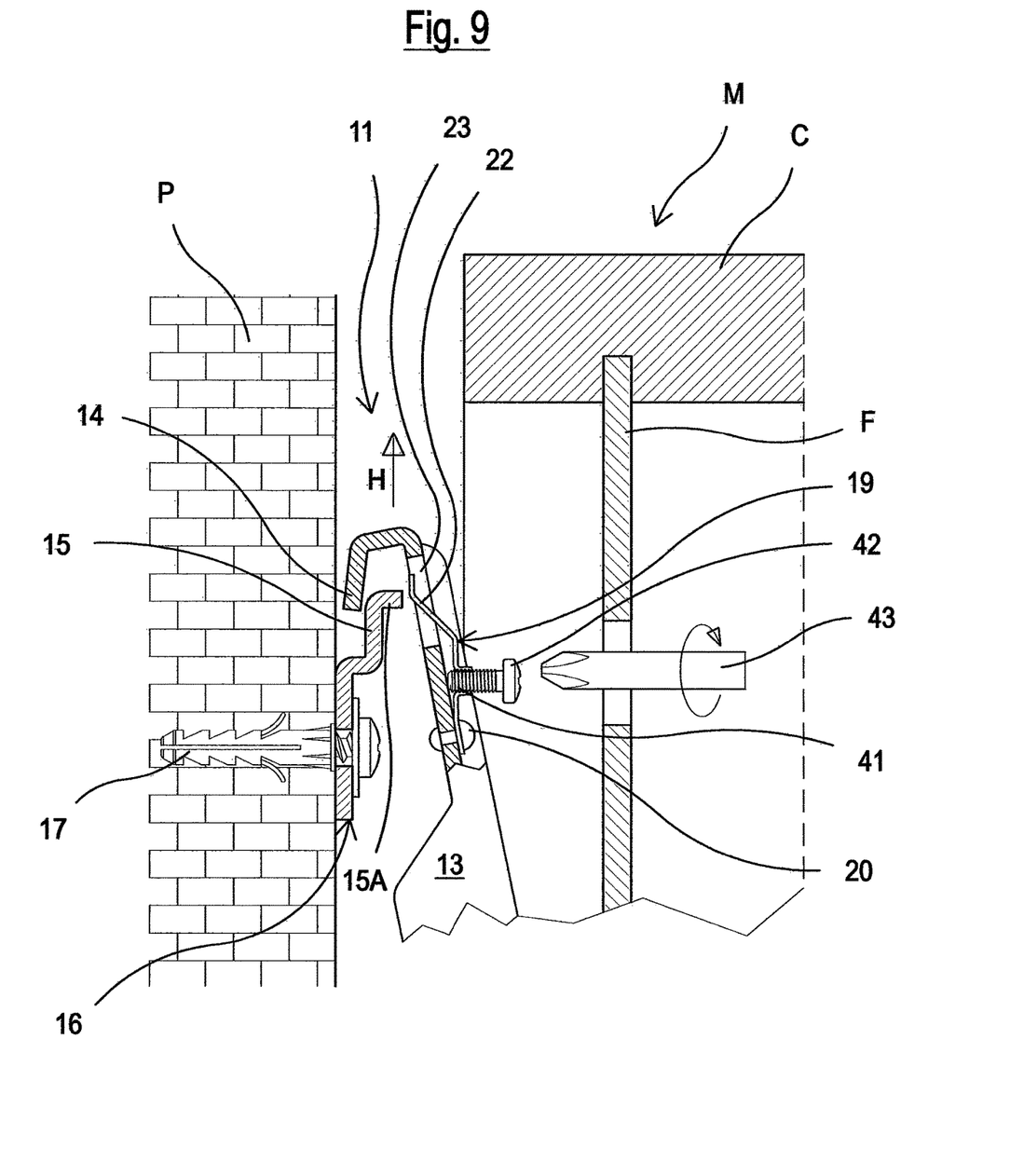

FIGS. 8 and 9 show an alternative disengagement of the system of the present invention, achieved by means of mechanical screw systems.

In this case, the elastic lamina 19 has a threaded pass-through seat 41 for a screw 42.

Said screw 42 can be positioned therein right from the hooking assembly or it can be screwed into its seat 41 when the cupboard must be disassembled, by unhooking it from the wall P.

It is evident that once the screw 42 has been positioned in its seat 41, if further screwed by means of a screwdriver 43, it creates a thrust on the outer surface of the body of the hook 13.

This screwing action causes the flexion of the elastic lamina 19 and the detachment of the same from the body of the hook 13 so that the free end 22 of the elastic lamina 19 is moved towards the window 23 formed in the body of the hook 13, clearly shown in FIG. 9.

At this point, it is sufficient to lift the cupboard M in the direction of the arrow H thus causing the unhooking of the hanging bracket 11 from the bar 16.

This can occur thanks to the fact that the action of the screw 42 is such that the free end 22 of the elastic lamina 19 is disengaged from any possible incidence with the horizontal square-folded flap (edge) 15A of the section 15 of the bar 16.

Consequently, also in this case, a rapid and simple unhooking action of the cupboard M, i.e. of the hanging bracket 11 from the bar 16 on the wall P, has been effected.

Figure 10:
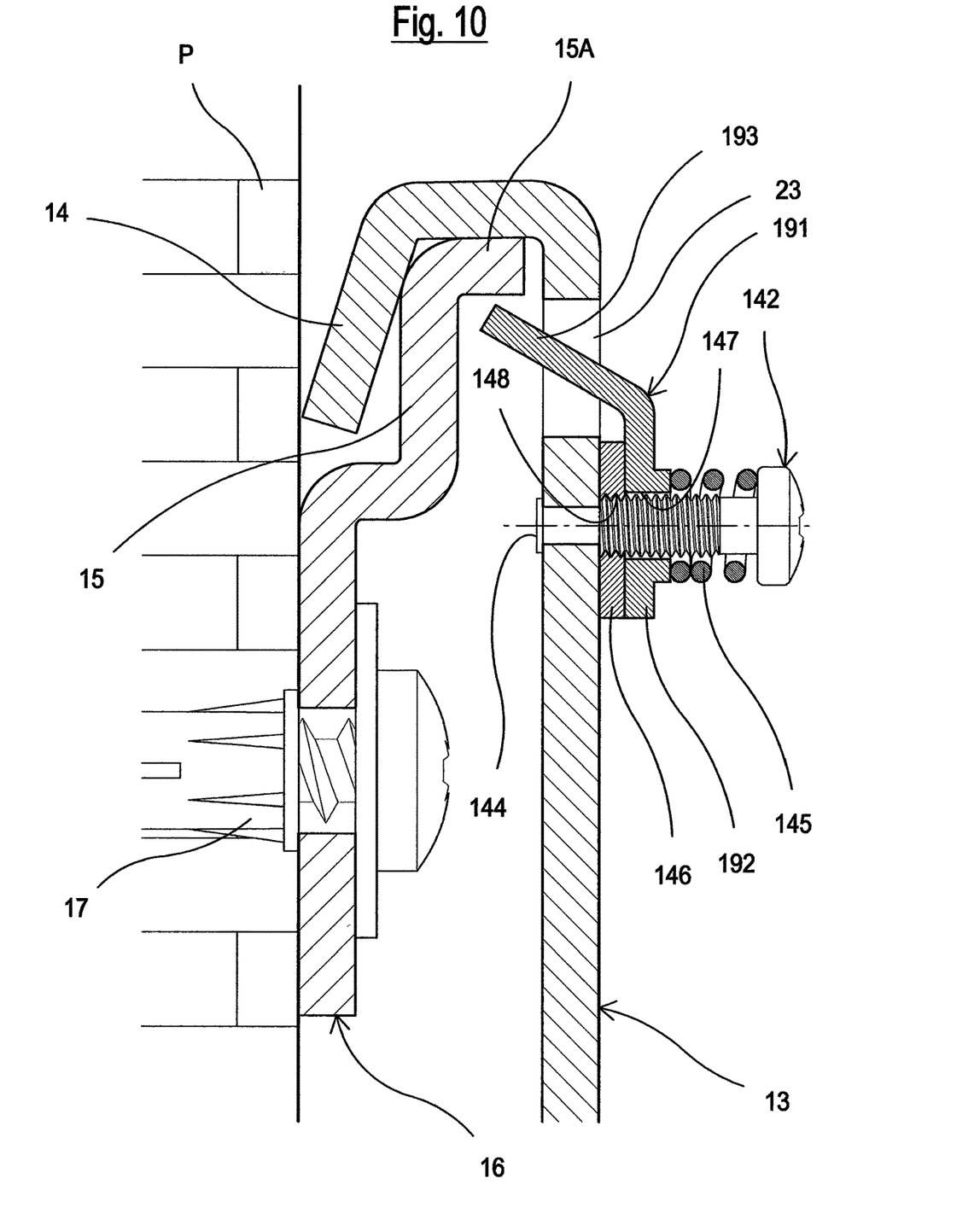
FIG. 10 is a partially sectional raised side view illustrating a second embodiment of the system according to the invention.

FIG. 10 shows a partially sectional raised side view of a second further embodiment of the system according to the invention.

In this further example, the same elements have the same reference numbers.

The elastic lamina 19 of the previous example is substituted by a flap 191 held integral with the hook 13 by means of a screw 142 of which a free end 144 is clenched on the hook 13, forming an axial constraining means which also allows rotation.

The flap 191 provides a fixing portion 192 to a body of the hook 13 and a folded free end 193 which is inserted in a window 23 formed in the body of the hook 13 to face the inside of a curved tooth 14 of the hook 13.

A spring 145 is inserted on the stem of the screw 142, which is abutted on the shaped fixing portion 192 of the flap 191. A nut 146 is inserted between the fixing portion 192 and a surface facing the hook 13, said nut having an anti-rotation plane which firmly engages it in this position. Furthermore, the fixing portion 192 of the flap 191 comprises a pass-through hole 147, whereas a nut 146 is provided with an internal threading 148 complementary to the outer threading of the screw 142.

The flap 191 and the spring 145 combined with each other thus positioned also form elastically yielding engagement elements forming part of the anti-disengagement system according to the present invention.

In this case, the disengagement is obtained by simply screwing the screw 142 in the nut 148 so as to cause the lifting of the flap 191 thanks to the presence of the spring 145 which yields and becomes packed.

The free end of the flap 191 is therefore able to become detached from any possible engagement with the horizontal square-folded flap 15A of the section 15 of the bar 16, allowing the withdrawal of the flap in the window 23, the unhooking of the hook 13 and consequently of the wall cupboard M from the bar 16.

Figure 11:
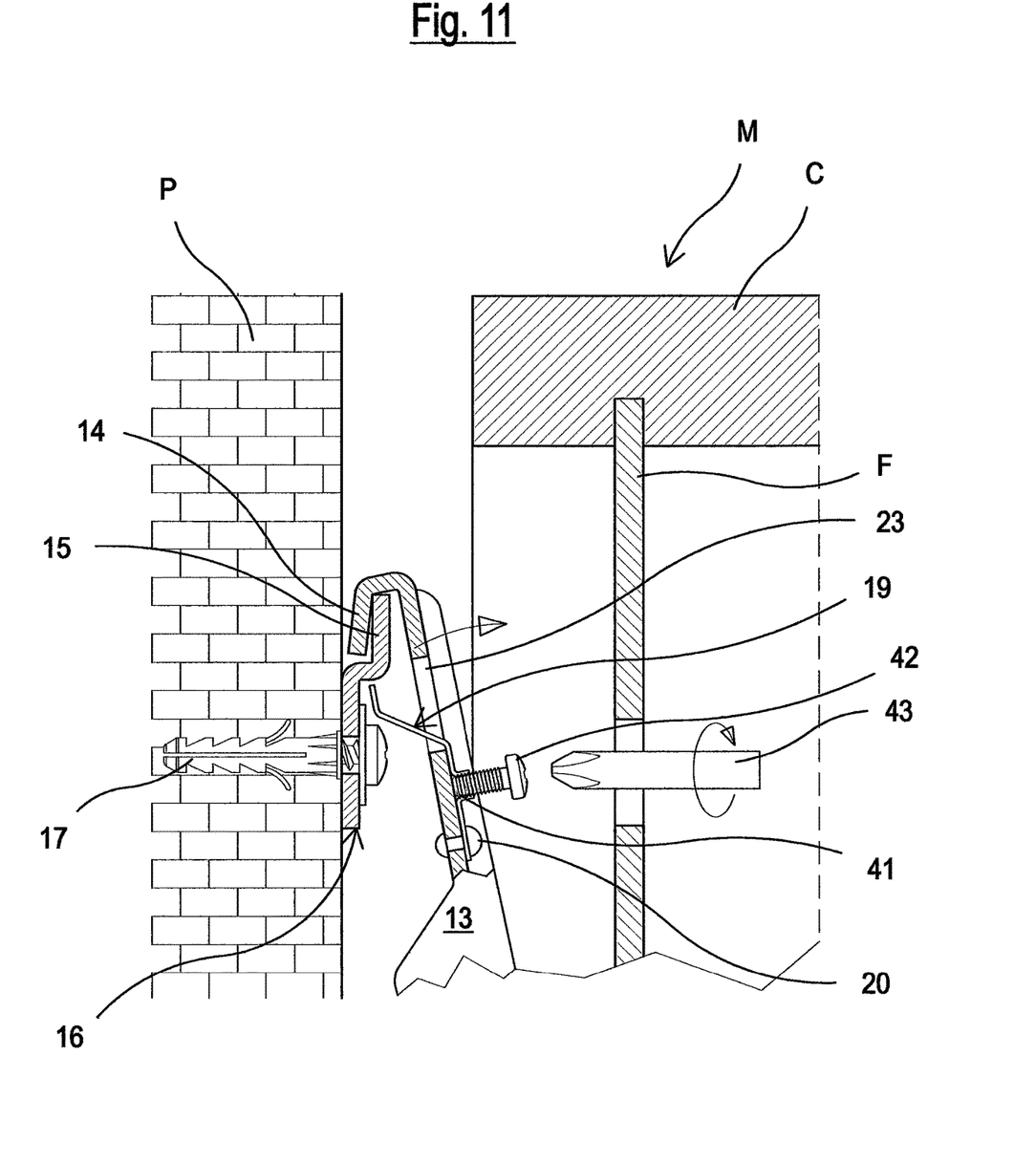
FIGS. 11 and 12 are partially sectional raised side views illustrating a third embodiment of the system according to the invention.
Figure 12:
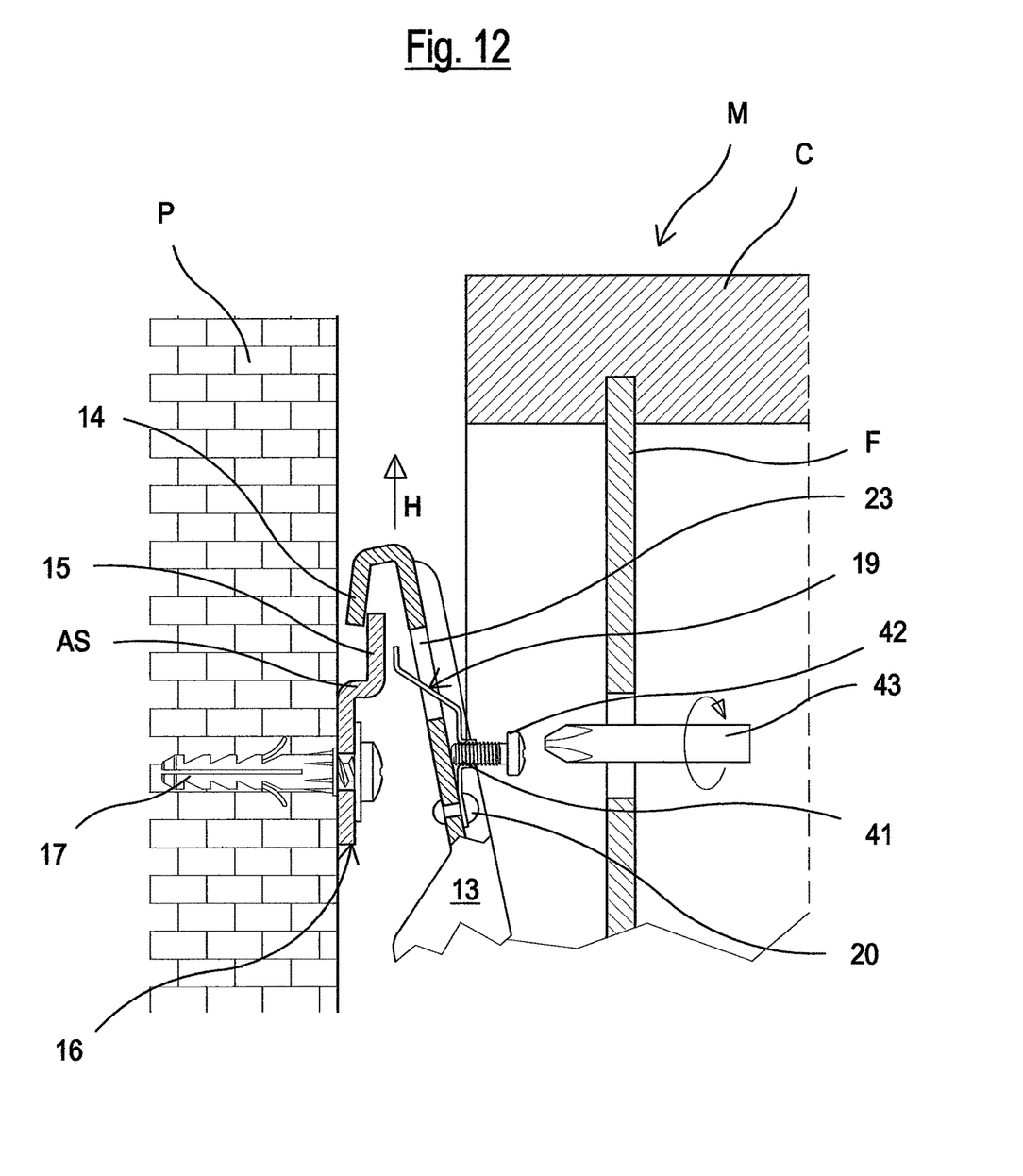

FIGS. 11 and 12 are two partially sectional raised side views, illustrating a third further embodiment of the system according to the invention.

The reference numbers present in the above description are also used, when possible, in this example.

It should also be noted that in this example, there is a similar situation to that proposed in FIGS. 1-5 with the addition that the threaded pass-through seat for a screw 42 which collaborates in the disengagement phase, is provided directly in the elastic lamina 19.

The system of the invention provides the hook 13 of the hanging bracket 11, positioned at the rear of the wall cupboard M, wherein the hook 13 comprises the curved hooking tooth 14 destined for being hooked to a corresponding section 15 of a metal bar or plate 16 fixed to a wall P by means of dowels 17.

Also in this example of FIGS. 11 and 12, the section 15 of the bar 16 defines with the wall P, a channel 18 where the curved tooth 14 is housed, but the bar 16 has a substantially overturned "S"-shaped section with a central portion AS.

In this case, the elastic lamina 19, when operatively assembled, is positioned beneath the above-mentioned central portion AS which forms a small shelf.

The horizontal flap 15A square-folded directly from the section 15 of the bar 16, which acts as an undercut of the bar 16, is not in fact present as in the example of FIGS. 1-5.

The anti-disengagement system of this example, however, also works equally well as those of the previous examples.

The objectives mentioned in the preamble of the description have therefore been achieved, in particular the extremely important objective of providing a practical and safe anti-disengagement system, with a secure blocking of the wall cupboard when hanging.

Furthermore, in spite of the safe positioning and activation of the anti-disengagement system, it can be seen how it is possible to act in disengagement by operating on the system of the present invention.

The anti-disengagement system for a hidden hanging bracket for wall cupboards according to the present invention therefore minimizes or even completely eliminates any type of intervention by the user in the hooking phase of the wall cupboard to the wall.

Furthermore, an anti-disengagement system for a hidden hanging bracket for wall cupboards is provided, which can also be easily used in the case of a supporting wall which is not perfectly vertical or with a raised portion due to the presence of tiles.

The protection scope of the present invention is defined by the enclosed claims.

The invention claimed is:
1. An anti-disengagement system configured to be automatically activated, comprising:
   a support, and
   a hanging bracket for wall cupboards,
   wherein a wall cupboard is hooked to the support fixed to a wall with a movable hook having a curved hooking tooth forming part of the hanging bracket coupled to said wall cupboard at a rear thereof in hidden position,
   wherein said support and said curved hooking tooth of said movable hook cause an engagement element to be automatically snap-activated upon insertion of said curved hooking tooth into a housing of said support,
   wherein said engagement element is elastically yielding,
   wherein said engagement element comprises an elastic plate fixedly coupled, in at least one part thereof, with said hook, and
   wherein said elastic plate comprises a fixing portion fixed to a body of the hook and a free end that passes through a window formed in the body of the hook to face an inside of the curved hooking tooth of said hook.

2. The anti-disengagement system according to claim 1, wherein said free end of said elastic plate is shaped as a flattened "S" which exerts an opposing action upon pressure on one extremity thereof.

3. The anti-disengagement system according to claim 1, wherein said free end extends as far as an inside of the curved hooking tooth of the hook to exert an anti-disengagement hooking action in collaboration with a folded flap extending outwardly from an end section of said support, after said curved hooking tooth of the hook has been housed in a channel of said support.

4. The anti-disengagement system according to claim 1, wherein said support comprises a bar or plate fixed to said wall, wherein said bar or plate has a section which defines, with said wall, a channel where said curved hooking tooth of said hook is housed.

5. The anti-disengagement system according to claim 1, wherein said support comprises a bar or plate, wherein said bar or plate has a section essentially shaped as an overturned "S" with a central portion disposed as a shelf, below which a plate forming said engagement element is positioned.

6. The anti-disengagement system according to claim 5, wherein said engagement element comprises said elastic plate attached with said at least one part thereof to said hook, and wherein said elastic plate comprises a threaded pass-through seat for a screw.

7. An anti-disengagement system configured to be automatically activated, comprising:
a support, and
a hanging bracket for wall cupboards,
wherein a wall cupboard is hooked to the support fixed to a wall with a movable hook having a curved hooking tooth forming part of the hanging bracket coupled to said wall cupboard at a rear thereof in hidden position,
wherein said support and said curved hooking tooth of said movable hook cause an engagement element to be automatically snap-activated upon insertion of said curved hooking tooth into a housing of said support,
wherein said engagement element is elastically yielding, and
wherein said engagement element comprises an elastic plate attached with at least one portion fixed to to said hook, and wherein said elastic plate comprises a threaded pass-through seat for a screw.

8. An anti-disengagement system configured to be automatically activated, comprising:
a support, and
a hanging bracket for wall cupboards,
wherein a wall cupboard is hooked to the support fixed to a wall with a movable hook having a curved hooking tooth forming part of the hanging bracket coupled to said wall cupboard at a rear thereof in hidden position,
wherein said support and said curved hooking tooth of said movable hook cause an engagement element to be automatically snap-activated upon insertion of said curved hooking tooth into a housing of said support,
wherein said engagement element is elastically yielding, and
wherein said engagement element comprises a flap affixed to said hook with a screw, wherein one free end of the screw is clenched on the hook, forming an axial constraining member that is free to rotate, a spring abutted on an end of the flap being inserted on a stem of said screw.

9. The anti-disengagement system according to claim 7, wherein said flap comprises a fixing portion fixed to a body of the hook and a folded free end, which is inserted in a window formed in the body of the hook to face an inside of said curved hooking tooth of said hook.

10. The anti-disengagement system according to claim 8, wherein a nut is inserted between said fixing portion and a surface facing the hook, said nut being provided with an anti-rotation plate which firmly engages said nut in position.

11. The anti-disengagement system according to claim 8, wherein said fixing portion of said flap comprises a pass-through hole, further comprising a nut provided with an internal threading complementary to an outer threading of the screw.

12. The anti-disengagement system according to claim 7, wherein said flap extends as far as an inside of the curved hooking tooth of the hook to exert an anti-disengagement hooking action in collaboration with a folded edge of a section extending outwardly from an end section of said support, after said curved hooking tooth of the hook has been housed in a channel of said support.

* * * * *